(12) United States Patent
Cotteverte et al.

(10) Patent No.: US 6,453,784 B1
(45) Date of Patent: Sep. 24, 2002

(54) APPARATUS FOR CUTTING INDIVIDUAL PIECES FROM A CONTINUOUSLY MOVING EXTRUDED STRAND

(75) Inventors: Patrick Cotteverte, Illkirch Graffenstaden; Daniel Bernard, Urmatt, both of (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,858
(22) PCT Filed: May 3, 2000
(86) PCT No.: PCT/DE00/01369
§ 371 (c)(1), (2), (4) Date: Feb. 21, 2001
(87) PCT Pub. No.: WO00/67587
PCT Pub. Date: Nov. 16, 2000

(30) Foreign Application Priority Data

May 5, 1999 (DE) .......................................... 199 20 610

(51) Int. Cl.⁷ .............................. B26D 7/08; B26D 1/56
(52) U.S. Cl. ............................. 83/168; 83/145; 83/155; 83/298; 83/303; 83/320; 83/328; 83/337; 83/343; 83/823

(58) Field of Search .......................... 83/304, 337, 303, 83/343, 326, 344, 327, 821, 328, 823, 329, 338, 346, 578, 168, 320, 145, 155, 130, 298, 146, 318

(56) References Cited

U.S. PATENT DOCUMENTS

| | | | | | |
|---|---|---|---|---|---|
| 1,304,034 | A | * | 5/1919 | Edwards ....................... | 83/304 |
| 1,989,012 | A | * | 1/1935 | Kalko ........................... | 83/328 |
| 2,157,000 | A | * | 5/1939 | Morgan et al. ................ | 83/328 |
| 3,224,671 | A | * | 12/1965 | Johnson et al. ............ | 83/346 X |
| 3,247,744 | A | * | 4/1966 | Huck et al. ................... | 83/107 |
| 3,922,939 | A | * | 12/1975 | Schlueter et al. ............. | 83/299 |
| 3,946,630 | A | * | 3/1976 | Roehrig ....................... | 83/311 |
| 4,640,164 | A | * | 2/1987 | Pavlov ........................ | 83/304 |

* cited by examiner

Primary Examiner—Boyer Ashley
(74) Attorney, Agent, or Firm—Ronald E. Greigg

(57) ABSTRACT

An apparatus for cutting individual pieces from an extruded strand fed at a constant velocity ($v_o$) has two cutting blades, which are disposed on disks and rotate in circular paths. In order to align the cutting blades perpendicular to the feed direction of the extruded strand, the blade supports holding the cutting blades are coupled to each other by means of guide rods. The guide rods simultaneously constitute the rotation axes of deflection rolls of a conveyor belt transporting the extruded strand.

11 Claims, 2 Drawing Sheets

APPARATUS FOR CUTTING INDIVIDUAL PIECES FROM A CONTINUOUSLY MOVING EXTRUDED STRAND

BACKGROUND OF THE INVENTION

1. Field of the Invention
2. Description of the Prior Art

This invention relates to an apparatus for cutting a moving strand, and more particularly to an improved apparatus for cutting individual pieces from a continuously moving extruded strand.

An apparatus for cutting individual pieces from a continuously moving extruded strand has been disclosed by DE 33 15 925 C2. This known apparatus has two stripping drums that contact the extruded strand. The drums have openings that permit cutting blades to reach through, which cutting blades are each moved in a circular path by means of a transmission mechanism. After cutting of the individual pieces are accelerated in order to produce a gap between it and the extruded strand before being transferred into a transfer apparatus. Because of the stripping drums and the transfer mechanism of the cutting blades, the known apparatus has a relatively expensive design.

SUMMARY OF THE INVENTION

The apparatus according to the invention for cutting individual pieces from a continuously moving extruded strand has the advantage over the prior art that it is relatively simple in design and requires a small amount of space.

In one embodiment of the invention, the conveyor belt has a contactless section in which the rods guiding the blade supports are simultaneously rotation axes of deflection rolls of the conveyor belt. This embodiment has the advantage that the contactless section is always aligned with the cutting blades so that the contactless section can be designed to be very short. As a result, sagging of the extruded strand can be prevented.

BRIEF DESCRIPTION OF THE DRAWINGS

Other features and advantages of the invention will be apparent from the detailed description of an exemplary embodiment of the invention described below and illustrated in the drawings in which.

DESCRIPTION OF THE PREFERRED EMBODIMENT

Figure 1:
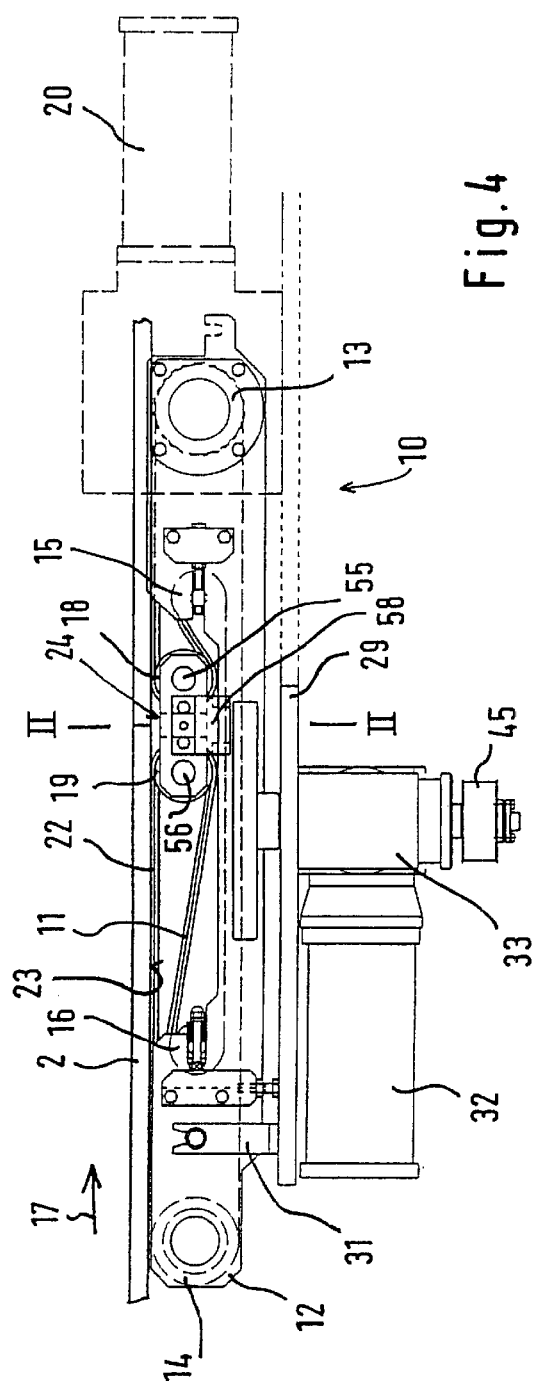
FIG. 1 is a simplified side view of the apparatus according to the invention.
Figure 4:
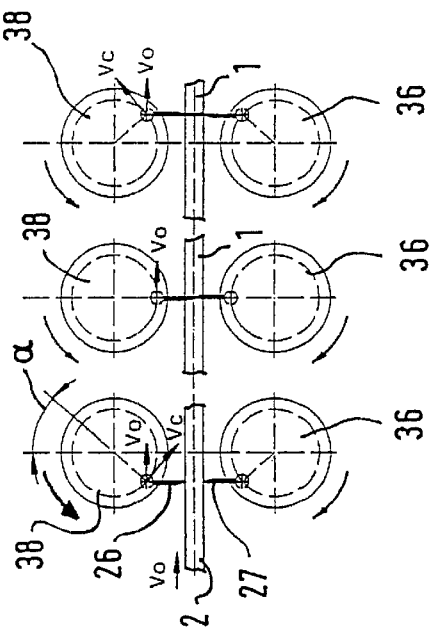
Figure 2:
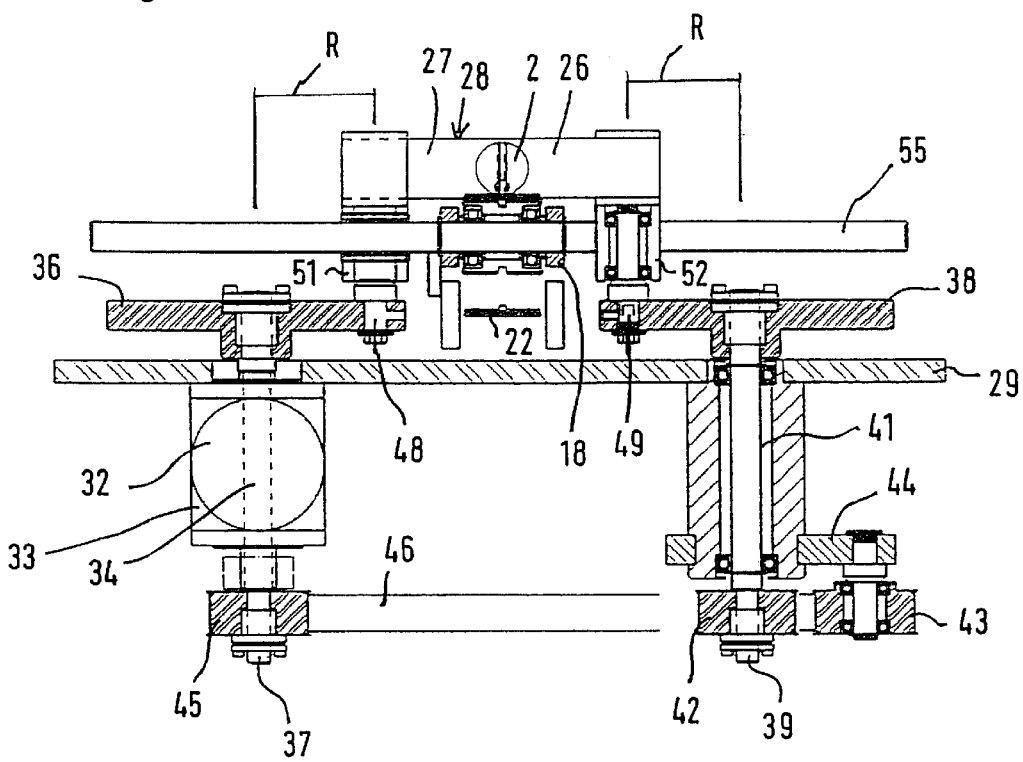
FIG. 2 is a section along the plane II—II of FIG. 1.
Figure 3:
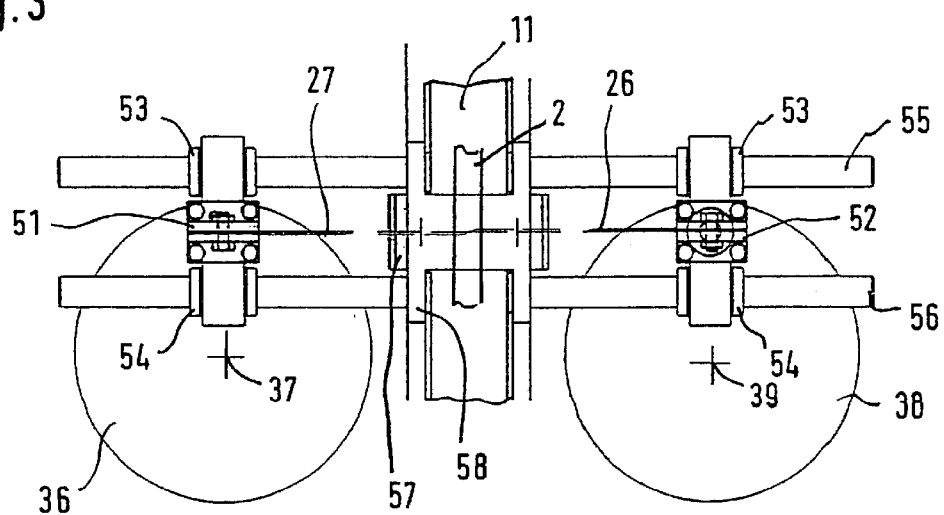
FIG. 3 is a top view of a part of the apparatus according to FIGS. 1 and 2, and FIGS. 4a to 4c are a schematic depiction of the cutting process.

The apparatus 10 shown in FIGS. 1 to 3 is used to cut an individual piece 1 FIG. 4 of a definite length from an extruded strand 2 moving at a constant velocity $v_0$. Possible extruded strands 2 particularly include extruded strands of candy such as extruded bonbon strands and the like, which have a strength and consistency such that they are not deformed when cut or are not significantly deformed.

The apparatus 10 has a feed device in the form of an endlessly revolving conveyor belt 11 for the extruded strand 2 and the individual piece 1 respectively cut from it. The conveyor belt 11 has four stationary deflection rolls 13 to 16 disposed in side walls 12 and two deflection rolls 18, 19 that can be moved together in the feed direction 17 of the extruded strand 2 or counter to it. A first drive motor 20 for the conveyor belt 11 continuously drives the one deflection roll 13 with a constant speed. Because the belt 22 of the conveyor belt 11 winds around the deflection rolls 13 to 16 and 18, 19, a flat supporting surface 23 for the extruded strand 2 is produced, which is interrupted in a section 24 between the two deflection rolls 18, 19. In the section 24, two cutting blades 26, 27, which are components of a cutting device 28, can be moved lateral to the feed direction 17 of the extruded strand 2.

The cutting device 28 also includes a second drive motor 32 disposed underneath a table top 29, which also supports the side walls 12 via supports 31. The drive motor 32, which is preferably embodied as an electronically regulated servomotor, is flange-mounted to a transmission case 33 which has a drive shaft 34 that passes through the transmission case 33 at the top and bottom. The top end of the drive shaft 34 is non-rotatably connected to a first disk 36 whose rotation axis 37 extends perpendicular to the feed direction 17, wherein the disk 36 is disposed lateral to and underneath the support surface 23 of the conveyor belt 11. On the opposite side of the conveyor belt 11 from the first disk 36, there is an identical second disk 38 with a rotation axis 39, wherein the distance of the rotation axes 37, 39 from the conveyor belt 11 is equal. The second disk 38 is non-rotatably supported on an axle 41, whose bottom end supports a first belt wheel 42. A second belt wheel 43 is held by a support plate 44 so that it is stationary in relation to the first belt wheel 45. A third belt wheel 45 is non-rotatably fastened to the bottom end of the drive shaft 34 at the same height as the two belt wheels 42, 43. The belt wheels 42, 43, 45 are wound around by a toothed belt 46 that has teeth on both sides so that the two disks 36, 38 are synchronously driven in opposite rotation directions by the drive motor 32.

A blade support 51, 52 is disposed in an axis 48, 49 in each disk 36, 38, at a respective distance R from the rotation axes 37, 39. The blade supports 51, 52 are used to align the two cutting blades 26, 27 in such a way that they always move perpendicular to the feed direction 17 of the extruded strand 2 when the disks 36, 38 are rotated. To this end, guide eyelets 53, 54 are respectively disposed on the blade supports 51, 52 on both sides of the cutting blades 26, 27 and can be moved on two guide rods 55, 56 disposed parallel to each other and to the cutting blades 26, 27. It is also crucial that the guide rods 55, 56 simultaneously constitute the rotation axes of the two deflection rolls 18, 19 of the conveyor belt 11. Since the guide rods 55, 56 are connected to the disks 36, 38 via the blade supports 51, 52, when the disks 36, 38 rotate, both the guide rods 55, 56 and the two deflection rolls 18, 19 respectively rotate synchronously in the feed direction 17 and counter to the feed direction 17, wherein the blade supports 51, 52 simultaneously turn in circular paths in opposite rotation directions.

The cutting blades 26, 27 are interchangeably fastened to the blade supports 51, 52 and are embodied and set in such a way that when revolving, they plunge simultaneously into the extruded strand 2 and cut it according to the shear principle as they continue their movement, wherein because of the cutting blade form, the two cutting blades 26, 27 can overlap each other in the position in which the blade supports 51, 52 are disposed at the closest distance from each other.

In order to permit the guidance of the cutting blades 26, 27 during the cutting procedure, a blade guiding body 57 with an opening slot for the cutting blade 26, 27 is disposed on each side of the extruded strand 2. In addition to guiding the cutting blades 26, 27, the blade guide bodies 57 are also used to clean the cutting blades 26, 27 by virtue of the fact that residual product adhering to the blade guide bodies 57 is stripped away when the cutting blades 26, 27 are moved. The blade guide bodies 57 are supported on a support 58, which is in turn fastened to the guide rods 55, 56 so that the blade guide bodies 57 are always aligned in relation to the rotating cutting blades 26, 27.

The above-described apparatus 10 functions as follows:

The conveyor belt 11 feeds the extruded strand 2 at a constant velocity $v_o$ in the feed direction 17. The drive motor 32 rotates the two blades 36, 38 clockwise and counterclockwise, wherein the cutting blades 26, 27 aligned perpendicular to the feed direction 17 rotate in circular paths. During the actual cutting of an individual piece 1 from the extruded strand 2 (FIGS. 4a to 4c), it is desirable for the forward component of the cutting blade velocity directed in the feed direction 17 to also correspond to $v_0$ so that during the cutting, there is no deformation of the individual piece 1 or of the extruded strand 2. Since the forward component of the cutting blade velocity is calculated as $v_c^* \cos \alpha$ ($v_c$ corresponds to the circumference velocity of the disks 36, 38 at the level of the rotation axes 37, 39), the drive motor 32 must change its speed and the circumference velocities of the disks 36, 38 in accordance with a cosine function.

The time interval from the cutting of an individual piece 1 off of the extruded strand 2 (FIG. 4c) to the next contact of the cutting blades 26, 27 with the extruded strand 2 (FIG. 4a), with a constant feed velocity of the extruded strand 2 by the conveyor belt 11, is used to determine the length of the individual piece 1. The greater the circumference velocity or angular velocity of the disks 36, 38 during this interval, the shorter the individual pieces 1 are cut.

The apparatus 10 can be modified in numerous ways without going beyond the scope of the invention. For example, in lieu of the drive motor 32 for the cutting blades 26, 27, it is conceivable to embody the drive motor 20 for the conveyor belt 11 with a changeable speed in order to achieve a synchronization of the cutting blade velocity with the feed velocity of the extruded strand 2 during the cutting process. With a constant speed of the drive motor 32, the length of the individual piece 1 can result from a changing of the speed of the drive 20 of the conveyor belt 11. However, a prerequisite for the above-mentioned modification is the ability to discontinuously supply a corresponding quantity of the extruded strand 2. It is also possible according to DE 33 15 925 C2 to increase the speed of the drive motor 32 after the actual cutting of the extruded strand in order to produce a gap between the extruded strand 2 and the individual piece 1 that has been cut from it.

The foregoing relates to preferred exemplary embodiments of the invention, it being understood that other variants and embodiments thereof are possible, within the spirit and scope of the invention, the latter being defined by the appended claims.

What is claimed is:

1. In an apparatus (10) for cutting individual pieces (1) from a continuously moving extruded strand (2), having a transport device (11) for the extruded strand (2) and two cutting blades (26, 27), disposed one on each side of the extruded strand (2) are driven for simultaneous movement crosswise and lengthwise of a feed direction (17) of the extruded strand (2) and are aligned perpendicular to a longitudinal direction of the extruded strand (2), the cutting blades being coupled to each other and actuated by a common drive mechanism (32), wherein the cutting blades (26, 27) respectively rotate in a circular path, the improvement wherein the two cutting blades (26, 27) are each disposed on a separate disk-shaped element (36, 38) by way of blade supports (51, 52) on an axis (48, 49) parallel to a rotational axis (37, 39) of the elements (36, 38) and wherein, in order to align the cutting blades (26, 27) perpendicular to the feed direction (17) of the extruded strand (2), the blade supports (51, 52) supporting the cutting blades (26, 27) are coupled to each other by means of at least one rod (55, 56) which extends alongside the cutting blades (26, 27) and aligned with them, said blade supports (51, 52) being mounted for movement on said at least one rod (55, 56).

2. The apparatus according to claim 1, wherein during the cutting of an individual piece (1) from the extruded strand (2), the common drive mechanism (32) of the cutting blades (26, 27) is capable of being operated at a variable speed adapted to a feed velocity ($v_0$) of the extruded strand (2) so that a velocity component of the cutting blades (26, 27) in the feed direction (17) of the extruded strand (2) corresponds to the feed velocity ($v_0$) of the extruded strand (2).

3. The apparatus according to claim 1, further comprising a pair of plate-shaped guiding and cleaning element (57) having a guiding opening extending therethrough, said guiding and cleaning elements being supported in position for each cutting blade (26, 27) to travel into and out of during rotation of the cutting blades.

4. The apparatus according to claim 3, wherein during the cutting of an individual piece (1) from the extruded strand (2), the common drive mechanism (32) of the cutting blades (26, 27) is capable of being operated at a variable speed adapted to a feed velocity ($v_0$) of the extruded strand (2) so that a velocity component of the cutting blades (26, 27) in the feed direction (17) of the extruded strand (2) corresponds to the feed velocity ($v_0$) of the extruded strand (2).

5. The apparatus according to claim 1, wherein the common drive mechanism for said cutting blades (26, 27) comprises a drive shaft (34) connected directly with one of the disk-shaped elements (36) and cooperates with the other disk-shaped element (38) by means of a toothed belt (46) with teeth on both sides.

6. The apparatus according to claim 5, further comprising a pair of plate-shaped guiding and cleaning element (57) having a guiding opening extending therethrough, said guiding and cleaning elements being supported in position for each cutting blade (26, 27) to travel into and out of during rotation of the cutting blades.

7. The apparatus according to claim 5, wherein during the cutting of an individual piece (1) from the extruded strand (2), the common drive mechanism (32) of the cutting blades (26, 27) is capable of being operated at a variable speed adapted to a feed velocity ($v_0$) of the extruded strand (2) so that a velocity component of the cutting blades (26, 27) in the feed direction (17) of the extruded strand (2) corresponds to the feed velocity ($v_0$) of the extruded strand (2).

8. The apparatus according to claim 1, wherein the transport device is embodied as a conveyor belt (11) with an endlessly revolving transport belt (22), that in the vicinity of the cutting blades (26, 27) and at the height of the extruded strand (2), the conveyor belt (11) has a contactless section (24), the transport device further comprising a pair of deflection rolls (18, 19) mounted one on each side of the cutting blades (26, 27) and engaging and deflecting the conveyor belt to provide said contactless section, and said at least one rod includes a pair of rods (55, 56) mounted on said disc-shaped elements and supporting said deflection rolls (18, 19) for rotation thereon.

9. The apparatus according to claim 8, wherein the common drive mechanism for said cutting blades (26, 27) comprises a drive shaft (34) connected directly with one of the disk-shaped elements (36) and cooperates with the other disk-shaped element (38) by means of a toothed belt (46) with teeth on both sides.

10. The apparatus according to claim 8, further comprising a pair of plate-shaped guiding and cleaning element (57) having a guiding opening extending therethrough, said guiding and cleaning elements being supported in position for each cutting blade (26, 27) to travel into and out of during rotation of the cutting blade.

11. The apparatus according to claim 8, wherein during the cutting of an individual piece (1) from the extruded strand (2), the common drive mechanism (32) of the cutting blades (26, 27) is capable of being operated at a variable speed adapted to a feed velocity ($v_0$) of the extruded strand (2) so that a velocity component of the cutting blades (26, 27) in the feed direction (17) of the extruded strand (2) corresponds to the feed velocity ($v_0$) of the extruded strand (2).

* * * * *